(12) United States Patent
Fischer et al.

(10) Patent No.: US 6,778,050 B2
(45) Date of Patent: Aug. 17, 2004

(54) JET CIRCUIT BREAKER SYSTEM

(75) Inventors: Klaus Fischer, Friedrichshafen (DE); Mike Wills, Huddersfield (GB)

(73) Assignee: Berthold GmbH & Co. KG (DE)

( * ) Notice: Subject to any disclaimer, the term of this patent is extended or adjusted under 35 U.S.C. 154(b) by 0 days.

(21) Appl. No.: 10/167,813

(22) Filed: Jun. 12, 2002

(65) Prior Publication Data

US 2003/0020576 A1 Jan. 30, 2003

(30) Foreign Application Priority Data

Jun. 15, 2001 (DE) .......................................... 101 28 920

(51) Int. Cl.[7] ................................................ H01F 7/08
(52) U.S. Cl. ...................... 335/275; 335/220; 335/229; 335/270
(58) Field of Search ................................ 335/205, 206, 335/207, 220, 229, 275; 359/227, 230, 231, 234, 235, 236

(56) References Cited

U.S. PATENT DOCUMENTS 4,389,627 A * 6/1983 Uesugi et al. ............... 335/206
4,880,293 A * 11/1989 Gilliland et al. ............ 359/230

* cited by examiner

*Primary Examiner*—Ramon M. Barrera
(74) *Attorney, Agent, or Firm*—St. Onge Steward Johnston & Reens LLC

(57) ABSTRACT

A circuit breaker system has been provided for the controlled interruption of at least one circuit, with a mechanical breaker element and an adjustment device coupled to the breaker element, so that the mechanical breaker element can be placed in at least a first, second, and third position in order to selectively break or let pass neighboring circuits in the first, second, or third position. The breaker element is rotatably secured in a fastening device, connected with one foot. The interruption conditions are provided by a magnetic coil, which exerts power by way of a magnetic field on a permanent magnet, which is secured to the breaker element. In the simplest case the circuit breaker system has three conditions at its disposal, by which one of two circuits can be broken. When the coil is without power, one circuit is broken. The other circuit is broken by reversing the circuit direction.

10 Claims, 1 Drawing Sheet

JET CIRCUIT BREAKER SYSTEM

This application claims priority of pending German Patent Application 101 28 920.0 filed on Jun. 15, 2001.

FIELD OF THE INVENTION

The invention relates to a circuit breaker system for the controlled interruption of at least one circuit, with a mechanical breaker element and an adjustment device coupled to the breaker element.

In an optical instrument (such as a camera, a microscope, etc.) or during an optical experiment, it is often necessary to controllably and selectively break a light circuit. A solution to the problem is offered, for instance, by devices consisting of a number of metal blades, which are arranged in a circle in the shape of a diaphragm, and which can be mechanically closed together, one over the other, similar to an iris diaphragm yet in a way that allows the circuit path to be completely broken. These circuit breakers can be powered and controlled electrically. This type of circuit breaker is offered, for instance, by the Melles Griot (catalogue p. 29.22, 1999), and it is designed for single-circuit systems.

In principle, it is possible with these elements to produce a circuit breaker system for more than one circuit, by means of the parallel arrangement of a number of circuit breakers. Yet this requires a greater expense for electronic control and diaphragm mechanics, since a number of diaphragms have to be provided, synchronized, and controlled by means of this complicated mechanism.

Therefore, it is the aim of this invention to provide a circuit breaker system for at least two circuits, which will prove less costly in terms of mechanics and electronic control.

This aim is fulfilled by a circuit breaker system of the type initially described, which is characterized by a mechanical breaker element, which can be adjusted to at least a first, second, and third position, in order to selectively break or let pass neighboring circuits in the first, second, or third position.

Compared to current technological developments, such an arrangement offers the advantage of creating interruption conditions in which at least one circuit is either broken or let through.

Such an arrangement offers the additional advantage that, with only one movable element, a number of circuits, and preferably light circuits, can be selectively broken. This allows for economies in terms of materials, complex mechanics, and electronic controls.

In a preferred embodiment, the adjustment device comprises a magnet device, which powers the breaker element. In comparison with an adjustment device powered by a motor, a magnetic device simplifies both the mechanical structure and control.

In another preferred embodiment, power is exerted on the breaker element via a permanent magnet, which is attached to the breaker element, and which works as the opposite pole of an electromagnet. Here, the electromagnet can be secured to the suspension device for instance, to which the breaker element is also attached. An additional option for energy transfer is provided, for example, when the breaker element is made of magnetized ferromagnetic material. It is also possible to replace the permanent magnet with a second electromagnet.

In an additional, special design, no circuits are broken when the magnetic device is not energized. For this model, the breaker element is kept suspended midway between the two circuits by the force of gravity. Preferably, such a configuration is selected if, under normal conditions, no circuit interruption is to take place.

Assuming that, under normal conditions, a circuit has to be broken, an additional design can be selected, which breaks at least one circuit when the magnetic device is not energized.

The circuit breaker system can therefore be configured for a variety of needs, and with a minimum of energy consumption.

In its simplest form, the invention can be applied to a two-circuit system, but is not limited to it. Accordingly, the motion device offers three modes.

Another version provides the circuit breaker system with a suspension device, which possesses at least one position-limiting element defining at least one of the breaker element's possible positions when the magnet is powered by energy.

Preferably, the breaker element, together with its suspension device, is attached to a fastening fixture so that the circuit breaker system can be placed and secured anywhere in the circuit's path.

For a special version, the fastening fixture is screwed to the base. But other mounting possibilities are also possible, including for instance a magnetic fastening, a clamping device, or attachment by means of gravity.

Preferably, the circuit breaker system is coupled to a damping device in order to reduce the breaker's mechanical vibrations. This reduces the effects of percussion or an oscillation that is slowly leveling out during the switching process, which otherwise would lead to oscillations of circuit intensity in the course of the switching process.

Another version includes a supporting brace between the fastening fixture and the suspension device, which improves mechanical stability.

Although the circuit breaker system is preferably applied to light circuits, it can break any type of circuits, especially any type of electromagnetic circuits, particle rays, such as electron rays, and even jets of water of the kind used when materials are cut.

Hereafter the preferred embodiments of the invention are further described and explained with reference to illustrations.

DETAILED DESCRIPTION OF DRAWINGS

Figure 1:
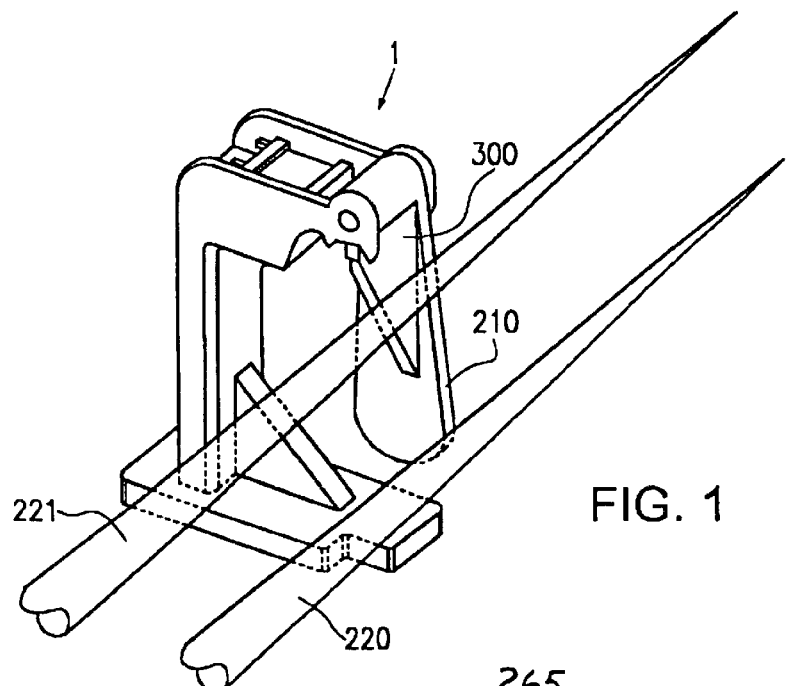
FIG. 1 Perspective view of the invention's circuit breaker system, executed as a two-circuit system.

The circuit breaker system 1 shown in FIG. 1 is designed for a two-circuit system. A breaker element 210 is suspended midway between the two light circuits 221 and 220. In this position, an adjustment device is inactive, so that the breaker element is held in its center position by gravity.

Figure 2:
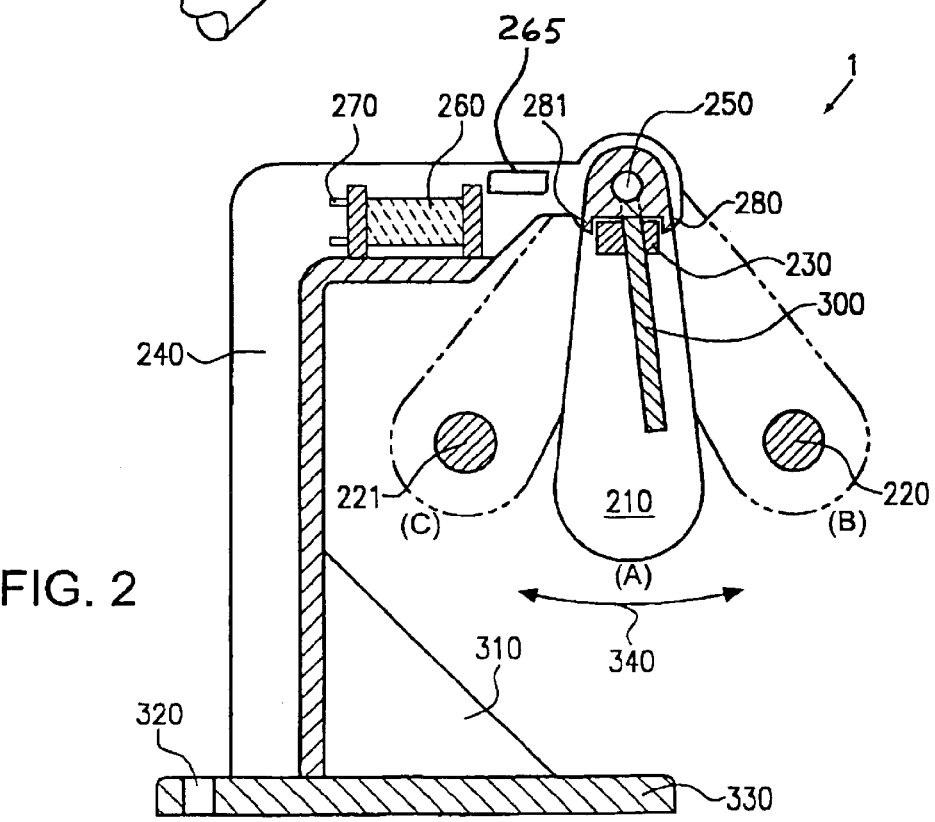
FIG. 2 Section of the inventive circuit breaker system.

FIG. 2 shows additional details of the same version. The cross section through the circuit breaker system 1 reveals a breaker element 210, a suspension device 240, and a fastening fixture 330. The section presented in FIG. 2 runs vertically to the direction into which two circuits 220 and 221 are traveling. The breaker element 210 is attached to an axis 250 in the suspension device 240 and can be rotated. A rigid part 300 at the breaker element 210 improves mechanical stability. A magnet coil 260, which is mounted in the suspension device 240, is able to create a magnetic field and thus exert power on the breaker element 210 via a permanent magnet 230, which is attached there. The magnet coil 260 can be supplied with power via electrical contacts 270, so that, depending on the electrical current's polarity, an attracting or rejecting power is applied to the breaker element 210. Two end stops 280 and 281 limit the movement of the breaker element 210. The suspension device 240 is attached to a fastening fixture 330, which enables the circuit breaker system 1 to be placed in any desired position on the circuit path. For mechanical stabilization, a support can be mounted between the fastening fixture 330 and the suspension device 240. The circuit breaker system 1 can be screwed to the base through a hole 320 in the fastening fixture 330 and thus secured.

Alternatively, it is also possible to fasten the device by means of a clamp, by gravity alone, or by magnets.

The magnet 230 is needed to transmit the magnetic field's power, which is generated by the coil 260, to the breaker element 210, but can be omitted if the breaker element 210 is made of ferromagnetic material.

For the version of the circuit breaker system 1 shown in FIG. 2, the breaker element 210 is not suspended centrally in the suspension device 240, but is shifted sideways, in order to make room for a support brace 300. The support 300 is triangular in shape and connected to the lateral surface of the breaker element 210 as an integral part, in order to improve mechanical stability.

When the coil 260 is not live, the breaker element 210 is secured in a center or resting position (A) between the two circuits 220 and 210 by gravity. When the coil 260 is switched live, the breaker element 210 moves from its resting position (A), depending on the polarity of the electric current running through the coil 260, in the direction shown by the arrow 340 to position (B), or alternatively, position (C). Two end stops 280 and 281 define the two circuit interruption positions (B) and (C), independently of the strength of the electric current through the coil 260 or the strength of the magnetic field.

In its form depicted in FIG. 2, the circuit breaker system 1 is a switch that can have three positions, in order to select the individual conditions of the switch using magnet technology. The three conditions are as follows:

In its normal position, the breaker element 210 is suspended in vertical position because of gravity, whereby the two light circuits are let through. At the same time, the coil 260 is not live.

When electric current with a predefined polarity passes through the coil 260, a magnetic field (N) is created at one end of the coil 260. This attracts the permanent magnet 230 in the part of the breaker element 210 which can change its position, and thus the breaker element 210 moves in order to black out one of the two circuits 220, 221. This condition continues until the electric current running through the coil 260 is switched off and the breaker element 210 returns to its normal position (A).

When an electrical current of the opposite polarity runs through the coil 260, a magnetic field (S) is created at one end of the coil 260. This rejects the permanent magnet 230 in the movable part of the breaker element 210, and thus the breaker element 210 moves in order to black out the other of the two circuits 220, 221. This condition continues until the electric current running through the coil 260 is switched off and the breaker element 210 returns to its normal position (A).

The mechanical design of the "three-stage switch" limits the movement of the breaker element 210 so that fluctuations of the electrical current from the coil cannot cause the movable part of the breaker element 210 to move beyond the circuit position of each of the two light circuits 220, 221.

The invention is not limited to a two-circuit system (not illustrated). By charging the coil with electric currents of varying strength, the breaker element can be deflected in various ways. In this manner, more than three conditions of interruption can be realized. Interruption of three or more circuits can be conceived.

Such a design of the breaker element can also enable the interruption of more than one circuit simultaneously.

Preferably, the circuit breaker system is coupled to a damping device 265 which reduces the breaker element's mechanical vibrations. This reduces the effects of percussion or an oscillation that is slowly leveling out during the switching process, which could lead to oscillations in circuit intensity in the course of the switching process.

The damping device 265 can be designed as an eddy current dimmer, for instance with a permanent magnet inducing eddy current into the breaker element, which may be made of, at least partly, conductive material such as aluminum.

A gas-pressure damping device, which can affect the axis 250 for instance, is conceivable as well.

An additional form of damper effect can be achieved by adjusting the coil's electric current.

Depending on application, the circuit breaker element is made of suitable material. For the interruption of visible light, for instance, black anodized aluminum can be used. In addition, it is conceivable to redirect the circuit in a desired direction by using a mirrored surface, or to selectively absorb, or else transmit, waves by using suitable filter materials.

What is claimed is:

1. Circuit breaker system for the controlled interruption of at least a first and a second circuit with a mechanical breaker element, an adjustment device coupled to the breaker element, and a control logic comprising: a first position in which the mechanical breaker interrupts the first circuit, a second position in which the mechanical breaker does not interrupt either the first or the second circuit, and a third position in which the mechanical breaker interrupts the second circuit.

2. Circuit breaker system according to claim 1, characterized in that the positions of the breaker element can be set by means of the adjustment device which comprises a magnetic device.

3. Circuit breaker system according to claim 2, characterized in that the adjustment device comprises an electromagnet and a permanent magnet.

4. Circuit breaker system according to claim 3, characterized in that the breaker element, with the adjustment device without power, is suspended in a central position through the force of gravity.

5. Circuit breaker system according to claim 3, characterized in that the circuit breaker system has a suspension device, to which the breaker element is suspended, so that the suspension device has at least one position-limiting element, which defines at least one of the positions of the breaker element, when the magnetic device is powered.

6. Circuit breaker system according to claim 5, characterized in that the circuit breaker system includes a fastening fixture, which can be secured on an object in any desired position in the circuit path by means of clamp, screw, magnetic field, or gravity, so that the circuit breaker system is secured.

7. Circuit breaker system according to claim 6, characterized in that a damping device is coupled to the breaker element.

8. Circuit breaker system according to claim 7, characterized in that the circuit breaker system includes a support brace between the fastening fixture and the suspension device of the breaker element.

9. A method for controlling the interruption of at least one circuit with a mechanical breaker element comprising the steps of:

actuating an electro-magnet to generate a magnetic field having a first polarity;

displacing the breaker element in a first direction to interrupt a first circuit;

actuating the electro-magnet to generate a magnetic field having a second polarity that is opposite to the first polarity;

displacing the breaker element in a second direction that is opposite to said first direction to interrupt a second circuit;

deactivating the electro-magnet so that no magnetic field is generated;

displacing the breaker element in the first direction to a neutral position where neither the first circuit or the second circuit is interrupted.

10. A circuit breaker system for the controlled interruption of at least one circuit comprising:

a mechanical breaker element;

an adjustment device coupled to said mechanical breaker element;

a first circuit;

a second circuit;

a positional logic including at least:
      a first position where said mechanical breaker element interrupts said first circuit;
      a second position where said mechanical breaker element does not interrupt either said first circuit or said second circuit; and
      a third position where said mechanical breaker element interrupts said second circuit.

* * * * *